US005090031A

United States Patent [19]

Pyne et al.

[11] Patent Number: 5,090,031

[45] Date of Patent: Feb. 18, 1992

[54] CAN COUNTING MACHINE

[76] Inventors: Melvin L. Pyne, P.O. Box 997, Brookings, Oreg. 97415; Robert B. Allsup, Box 2053, Harbor, Oreg. 97415

[21] Appl. No.: 597,676

[22] Filed: Oct. 9, 1990

[51] Int. Cl.[5] ........................ B65G 47/14; G06M 7/00

[52] U.S. Cl. ........................................ 377/6; 377/53; 198/392; 198/397

[58] Field of Search ...................... 377/6, 53; 414/901; 209/551; 198/392, 397; 250/223 R

[56] References Cited

U.S. PATENT DOCUMENTS

| | | | |
|---|---|---|---|
| 3,295,659 | 1/1967 | Aidlin | 198/397 |
| 4,130,194 | 12/1978 | Schindel et al. | 198/397 |
| 4,445,430 | 5/1984 | Pyne et al. | 209/551 |
| 4,454,028 | 6/1984 | Vetter et al. | 209/551 |
| 4,465,195 | 8/1984 | Buer et al. | 209/704 |
| 4,731,802 | 3/1988 | Magnusson et al. | 377/6 |
| 4,798,277 | 1/1989 | Dubuit et al. | 198/397 |
| 4,949,834 | 8/1990 | Schindel | 198/392 |

*Primary Examiner*—Stanley D. Miller

*Assistant Examiner*—Tai V. Duong

*Attorney, Agent, or Firm*—James D. Givnan, Jr.

[57] ABSTRACT

A can counting machine having an inclined housing into which a collection of beverage cans may be dumped. A rotor in the housing defines elongate openings spaced about its periphery for the singular reception and transport of cans upwardly to a discharge outlet in a backing plate rearward of the rotor. The rotor includes a rim projecting from the rotor for rotation therewith to facilitate lateral can movement into a disk opening. Ejector plates on the backing plate dislodge improperly, endwise inserted cans from the opening to prevent the simultaneous discharge of two cans past a can counting component. A motor circuit is responsive to motor loads resulting from a jammed can to automatically reverse motor and rotor direction. A receptacle support assembly receives a plastic bag and includes a frame member spring biased to maintain the bag in open configuration. A liquid barrier directs residual liquid from the cans to a receptacle. A display unit on the housing indicates a can total.

9 Claims, 2 Drawing Sheets

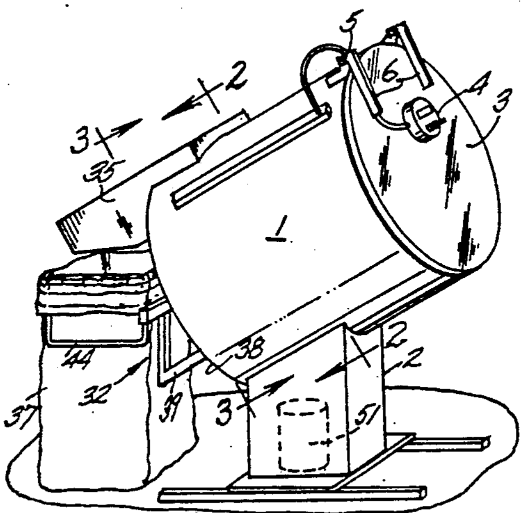
Fig. 1
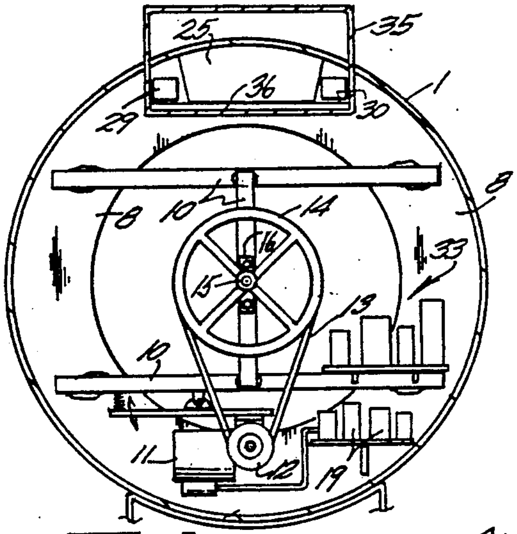
Fig. 3
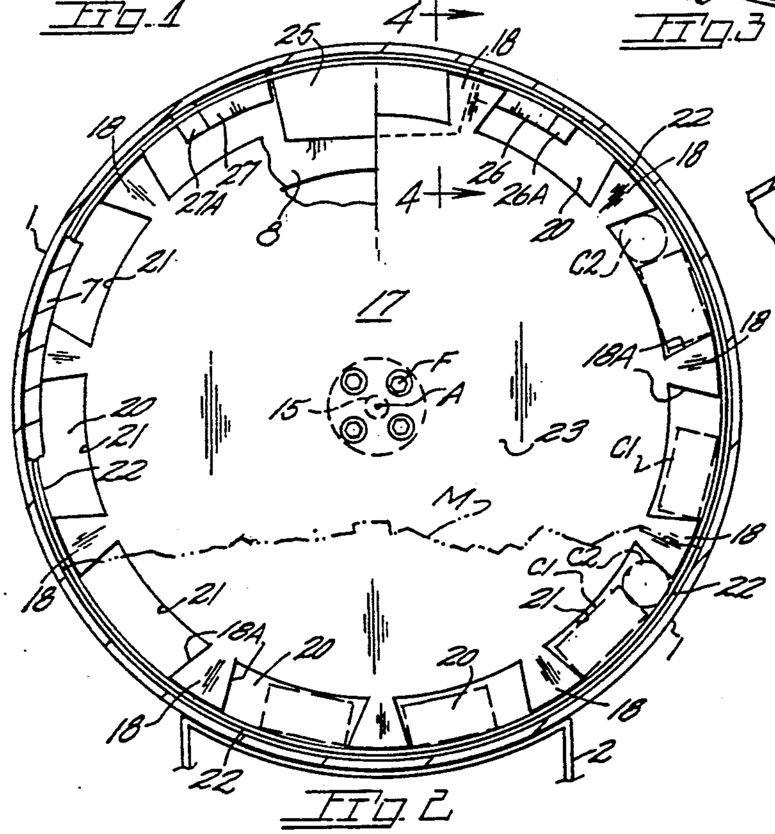
Fig. 2
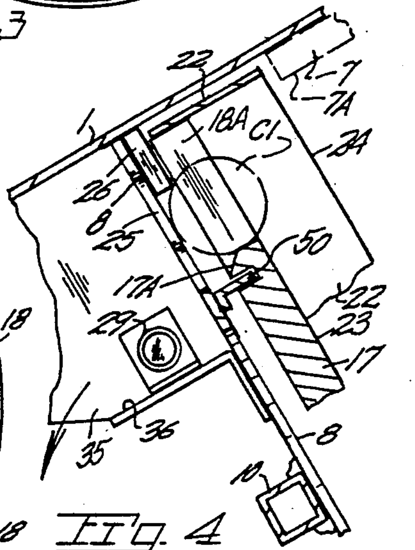
Fig. 4
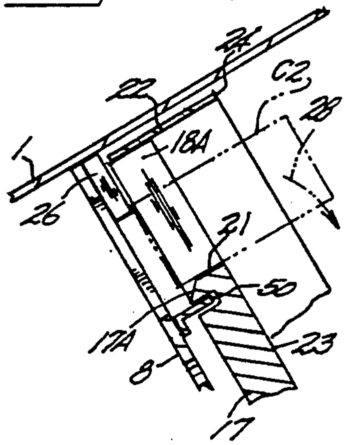
Fig. 5
Fig. 6
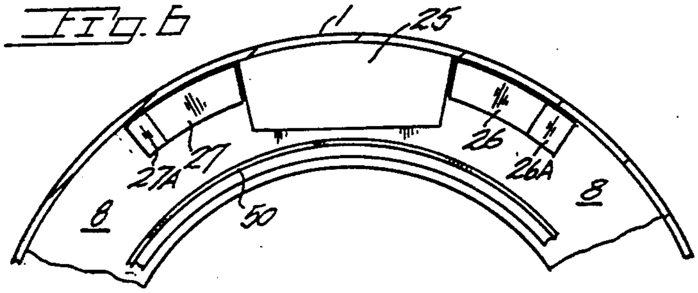

CAN COUNTING MACHINE

BACKGROUND OF THE INVENTION

The present invention pertains to machines for the counting of beverage cans for the purpose of determining the refund owed to the customer returning the cans and subsequently to the store from a can reclaiming firm.

By law in several states, the purchasers of canned beverages must pay a deposit at the time of purchase. Upon return of the container to the store, the customer is refunded the container deposit. The intent of such legislation is to deter the discard of containers along public access areas and secondly to effect a conservation of energy and materials by the recycling of aluminum. Various type of machines have been proposed for the counting of cans for the purpose of determining the refund. An example of such prior art machines are found in U.S. Pat. Nos. 4,445,430; 4,465,195 and 4,454,028. The foregoing patents also elaborate on problems encountered in can recycling. The primary purpose behind the development of can counting machines is the dispensing with the tedious manual counting of returned cans which may be inaccurate as well as costly from a labor standpoint over a period of time. Further, some retail establishments have entered into the dubious practice of accepting the customer's count of returned cans. In addition to the effort spent physically counting cans, there is the problem of customer relations when a disparity exists in the can count between store personnel and the customer. A still further drawback to known machines is the machines require a sorting effort on the customer's part. Further, the complexity and hence cost of known can processing machines is such as to render the machines cost prohibitive for use in small food stores or other retail establishments.

SUMMARY OF THE PRESENT INVENTION

The present invention is embodied within a machine into which a large quantity or batch of cans may be dumped for successive discharge past a counter mechanism and thence into a container, such as a plastic bag, which provides an accurate unit of measurement for store reimbursement from a can processing firm.

The present machine includes an inclined housing into which cans are dumped by a customer or store personnel with a rotor in the housing lower end serving to pick up the cans from the mass of cans therein and discharging same successively past a counting mechanism prior to discharge into a container. Important to the machine is the avoidance of discharging two or more cans past the counting mechanism resulting in a miscount. To avoid such errors, the present machine includes can displacement means which acts on improperly positioned cans to return same to the mass of cans in the housing. Ejector plates of the displacement means dislodge improperly positioned cans while allowing passage of properly positioned cans for singular discharge through a discharge opening past a counter component.

The rotor of the present machine defines openings about its perimeter within which cans are received in tangential relationship to the rotor for singular transport and discharge past the counting mechanism. The rotor includes a rim projecting axially to facilitate proper can orientation and entry into the rotor defined openings. A beveled surface is provided along an edge defining each rotor opening to facilitate gravitational discharge of a can. A receptacle in the form of a bag is supported by an arm assembly including a spring biased arm member to tension the bag in an open configuration. For the ease of use, a display unit is provided on a housing lid indicating the can count. To prevent stalling of the can pick up rotor and motor damage in case of a jammed can, a motor control circuit is responsive to an overload resulting from a stalled motor and reverses motor polarity for reversing motor direction.

Important objectives of the present can counting machine include the provision of such a machine of low cost construction and simplified operation permitting machine use in a wide range of retail establishments to provide a rapid and accurate can count of beverage cans or plastic bottles; the provision of a can counting machine which may be safely operated by store customers; the provision of a can counting machine which supports a plastic bag and allows easy bag installation and removal; the provision of a can counting machine with provision made for removing and collecting the residual liquid from cans; the provision of a machine for counting cans and bottles having a rotor assembly with a rim member projecting axially of the rotor proper to facilitate loading of openings spaced about the rotor periphery; the provision of a can counting machine with ejector plates displacing misoriented containers from a pick up rotor.

BRIEF DESCRIPTION OF THE DRAWINGS

In the accompanying drawings:

FIG. 1 is a perspective view of the present can counting machine;

FIG. 2 is a vertical sectional view taken along line 2—2 of FIG. 1;

FIG. 3 is a vertical sectional view taken along line 3—3 of FIG. 1;

FIG. 4 is a vertical sectional fragmentary view taken along line 4—4 of FIG. 2 disclosing an ejector plate for can dislodgment;

FIG. 5 is a view similar to FIG. 4 but showning an improperly positioned can prior to its dislodgment from the rotor;

FIG. 6 is a fragmentary sectional view similar to FIG. 2 but with the rotor removed;

DETAILED DESCRIPTION OF THE PREFERRED EMBODIMENTS

Figure 8:
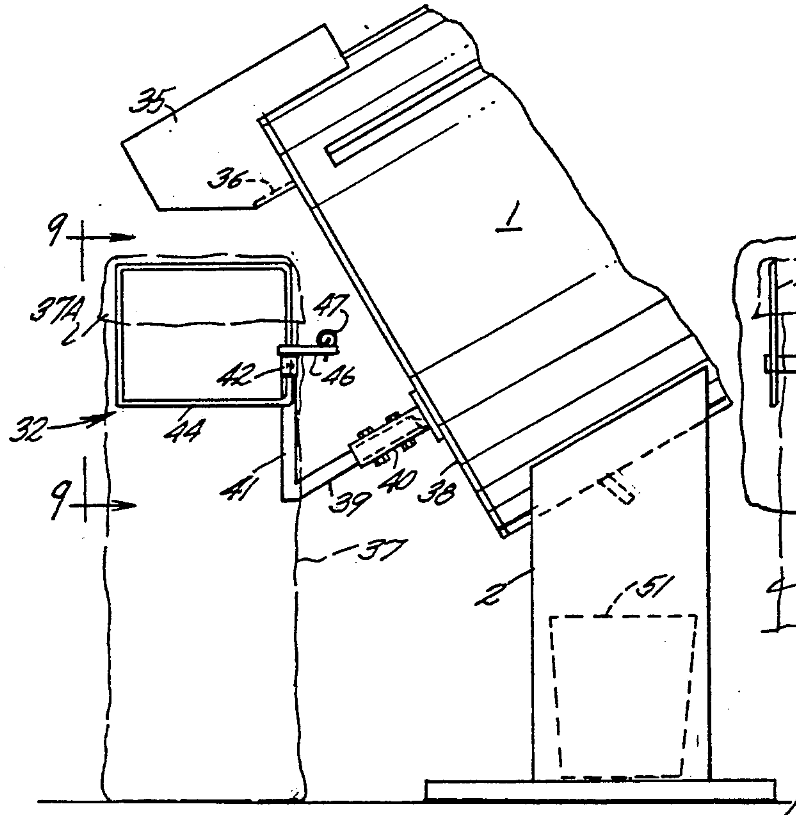
FIG. 8 is a fragmentary side elevational view of the present machine showing a bag support assembly.
Figure 9:
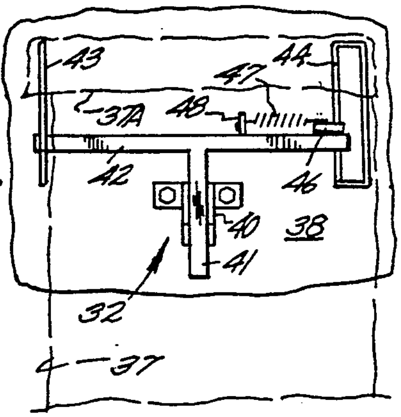
FIG. 9 is a rear elevational view taken along line 9—9 of FIG. 8.

With continuing attention to the drawings wherein applied reference numerals indicate parts similarly hereinafter identified, the reference numeral 1 indicates a cylindrical housing of the present machine supported in an inclined manner by a floor supported base 2.

Housing 1 has a frontal closure or door 3, preferably of transparent material on which a counter 4 is mounted to provide a display of a can count to a machine user. Hinges at 5 on the housing include tubular arms 6 secured to closure 3.

As shown in FIG. 2, the housing 1 is provided with a non-metallic cylindrical liner 7 for sound damping purposes. Affixed to the interior of housing 1 adjacent the lowermost or rearward end thereof is a circular plate 8 which, in turn, serves to carry a welded tubular framework 10. The framework serves as a support for an electric motor 11 and power transmission components 12, 13 and 14 the latter being a pulley in place on the shaft 15 of a later described rotor 17. Motor polarity reversing components are at 19. A bearing 16 in place on framework 10 receives rotor shaft 15 which carries a rotor mount through which fasteners F extend.

Rotor 17 is of a radius to substantially occupy a cross sectional area of housing 1 and includes circumferentially spaced projections 18 each having sides 18A which along with rotor edges define can receiving openings 20. A rotor circular rim at 22 is jointly carried by projections 18 and is affixed thereto by suitable fastening means not shown. Rim 22 projects forwardly from a rotor face at 23 and terminates in an annular edge 24 which is outwardly offset from the interior surface 7A of liner 7. Accordingly cans deposited onto the housing via its upper end come to rest in a can collection at M against rotor face 23 and gravitate into rotor openings 20 during rotor rotation. The openings are of a length to accommodate both sizes of beverage cans now in use. Rim 22 serves to assist in the position of cans in the can mass for correct entry into an opening 20 i.e., lengthwise disposition in the opening.

Displacement means are provided for the purpose of ejecting cans in place endwise within an opening 18 and projecting therefrom. By way of background, to permit the pick up of both regular and the somewhat larger sized beverage cans from the can mass, the can receiving openings 20 are of a length which may accept a lengthwise (properly) disposed regular sized can along with an endwise inserted can. To prevent delivery of both the properly and improperly oriented cans, C1 and C2, occupying an opening 20 at a can discharge port 25, ejector plates 26-27 are installed on circular plate 8 on opposite sides of discharge port 25. The plates permit passage therepast of properly oriented cans while acting on endwise inserted cans (FIG. 5) to cause can displacement from rotor opening 20. The ejector plates 26 and 27 are radially spaced from the rotational axis A of rotor 17 so as to permit passage of a properly or lengthwise disposed can in an opening 20 while obstructing passage of an end of an endwise inserted can in the same or other opening 20. During travel of a can from the collection of cans in the lower portion of the housing to port 25, the cans move in a circular path in sliding engagement with circular plate 8. If improperly positioned (FIG. 5), the can end will contact an ejector plate 26 or 27 (depending on the direction of rotor rotation) at which time the uppermost chordal portion of the can end will contact the beveled surface 26A or 27A of the ejector plate which will displace the can along its axis to the extent it becomes overbalanced and falls from the rotor opening per the arrow 28. A correctly positioned can, as shown at Cl in FIG. 4, passes radially inwardly of the ejector plate to avoid such displacement. To facilitate the gravitational discharge of a can from a rotor opening 20 and through discharge port 25 of plate 8, the rotor opening 20 has a beveled surface at 17A.

For counting of cans discharged from the rotor, a pair of photoelectric cell devices at 29 and 30 are mounted on circular plate 8 in an opposed manner so as to provide a beam through which cans must pass thereby to actuate resettable counter 4 on closure 3. Such counting devices are well-known and accordingly need not be elaborated upon. The counter mechanism, generally at 33, receives signals from the photoelectric cell and actuates counter 4. If so desired, an infrared sensor may be utilized for the counting of cans discharged by rotor 17. A discharge chute at 35 includes a bottom wall 36 down which a discharged can rolls past the can sensors 29-30. The chute 35 additionally serves to protect the can sensing cell from other than actuation by a passing can.

At the rear of housing 1 is a bag or receptacle support assembly indicated generally at 32, and supported by a housing rear wall 38, which serves to receive a plastic bag 37 and hold same open. Said bag assembly includes an arm structure affixed to rear wall 38 of housing 1 with the arm structure including a support arm 39 adjustably received within a tubular support 40. An upright arm 41 supports a cross member 42 which in turn carries, at its ends, frames 43 and 44 the latter frame being pivotally mounted on cross member 42. To impart opening movement to movable frame 44 for the purpose of tensioning the upper end of a plastic bag 37 to hold same open, frame 44 is provided with an arm 46 the outer end of which receives one end of a spring 47 while a remaining end of the spring is attached to a plate 48 on the cross member. Accordingly, frame 44 is at all times biased toward a bag opening or outward position to tension the bag with its upper end 37A folded over the two frames. Such bag installation provides uniform bag capacity to greatly facilitate subsequent processing of the bags of cans and the allowing of a refund to the store or other can collecting agency. At the completion of the bag filling, the folded over upper end segment of the bag is removed from the frames and tied. Tensioning of the bag upper end by frame 44 assures continued engagement of the bag upper end with the frame and prevents accidental disengagement of the bag.

To confine liquid draining from the cans, a barrier ring 50 on circular plate 8 confines the liquid on the forward surface of the plate to permit the liquid to drip into a container 51 in base 2.

Figure 7:
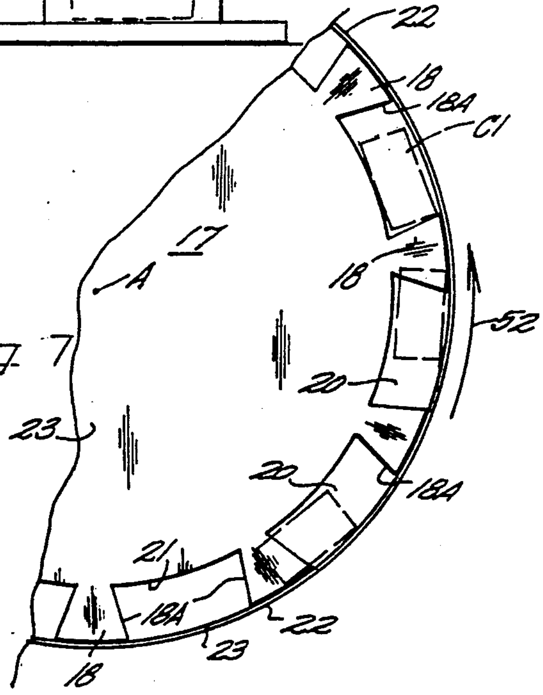
FIG. 7 is a fragmentary elevational view of the machine rotor with a can in stages of being loaded into a rotor opening.

During rotor rotation, the rotor rim 22 serves to preposition a can (or bottle) with the can axis parallel to an inclined plane containing face 23 of the rotor. During upward arcuate travel of rim 22, per arrow 52 in FIG. 7, the can will tend to gravitate initially along the inner surface of the rim and ultimately into a rotor opening 20. The rim 22 accordingly reduces the number of empty openings over a period of machine operation to minimize the counting time for a batch of containers.

The present machine is also capable of counting a batch of mixed cans and bottles when the latter are of the 16 oz., size as marketed in some states.

While we have shown but one embodiment of the invention, it will be apparent to those skilled in the art that the invention may be embodied still otherwise without departing from the spirit and scope of the invention.

Having thus described the invention, what is claimed and desired to be secured by a Letters Patent is:

1. A machine for counting empty beverage containers of elongate shape comprising,
   - a base,
   - a housing on said base and having an inclined major axis for the reception of a mass of containers to be counted,
   - a rotor in said housing including an inclined circular disk defining openings spaced about its periphery into which containers in said housing may gravitate, a rim on said disk and projecting therefrom in an axial direction, a support structure in said housing and including a circular backing plate proximate said disk having an outlet for the passage of containers gravitating from the disk openings, said plate additionally partially supporting containers traveling in said openings, motor and transmission means carried by said support structure for driving said disk, displacement means on said plate and spaced from the rotor axis to engage the end of an incorrectly positioned container in one of said openings and to displace same for return back into the mass of containers, detection means on said support structure actuated by a discharged gravitating container, counter means actuated by said detection means and a display unit driven by said counter means, and a receptacle support assembly on said housing for container collection.

2. The machine claimed in claim 1 wherein said displacement means includes an ejector plate disposed in the path of the end of a container incorrectly positioned in a disk opening to dislodge same from the disk opening prior to container passage past the plate defined outlet.

3. The machine claimed in claim 2 wherein said containers are in sliding contact with said circular plate, said ejector plate having a surface offset from said circular plate to axially displace an endwise inserted container to an overbalanced position.

4. The machine claimed in claim 3 wherein said disk includes projections partially defining the disk openings, each projection including outwardly diverging sides.

5. The machine claimed in claim 4 wherein said rotor additionally includes beveled edges between said projections to facilitate container discharge from the disk and passage past said detection means.

6. The machine claimed in claim 1 wherein said receptacle support assembly includes first and second frame members on which a bag-like receptacle may be placed, means biasing said first frame member away from said second frame member to support the receptacle in open configuration.

7. A machine for counting empty elongate containers comprising, a base, a housing on said base and having an inclined major axis for the reception of a mass of containers to be counted, a rotor in said housing including an inclined circular disk defining openings spaced about its periphery into which containers in said housing may gravitate, a rim projecting axially from the disk, a support structure in said housing and including a backing plate having an outlet for the passage of containers gravitating from the disk openings, motor and transmission means carried by said support structure for driving said disk, displacement means on said backing plate and spaced from the rotor axis to engage an end of an incorrectly positioned container in one of said openings and to displace same from said opening for return back into the mass of containers, detection means on said support structure actuated by a container subsequent to passage through said outlet, counter means actuated by said detection means and a display unit driven by said counter means.

8. The machine claimed in claim 7 wherein said displacement means includes an ejector plate disposed in the path of the end of an incorrectly positioned container to displace the container to cause same to fall away from the disk opening prior to passage past the outlet.

9. The machine claimed in claim 7 additionally including a receptacle support assembly on said housing for container collection.

* * * * *